United States Patent
Tateyama et al.

(10) Patent No.: US 6,485,806 B1
(45) Date of Patent: *Nov. 26, 2002

(54) LAMINATE CONTAINING A LAYER COMPOSED OF POLYPHENYLENE SULFIDE BLENDED WITH OTHER POLYMERS

(75) Inventors: Masaru Tateyama, Nagoya (JP); Kazufumi Matsui, Nagoya (JP); Sachio Shimizu, Nagoya (JP); Kazuya Ohno, Gifu (JP); Norio Shimasaki, Nagoya (JP); Atsushi Ishio, Nagoya (JP); Kazuhiko Kobayashi, Tokoname (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,955

(22) Filed: Nov. 5, 1997

(30) Foreign Application Priority Data

Nov. 8, 1996 (JP) .............................. 8-296898
Nov. 8, 1996 (JP) .............................. 8-296899
Nov. 8, 1996 (JP) .............................. 8-296900
Nov. 8, 1996 (JP) .............................. 8-296901

(51) Int. Cl.$^7$ .................. B32B 27/08; B32B 27/34; B32B 27/36
(52) U.S. Cl. .................. 428/36.9; 428/36.91; 428/419; 525/66; 525/92 B; 525/133; 525/150; 525/261
(58) Field of Search .................. 428/36.9, 36.91, 428/419; 525/66, 92 B, 133, 150, 261

(56) References Cited

U.S. PATENT DOCUMENTS

| | | | | |
|---|---|---|---|---|
| 4,654,255 A | * | 3/1987 | Kojima et al. | 428/261 |
| 4,795,671 A | * | 1/1989 | Shiiki et al. | 428/209 |
| 5,241,880 A | * | 9/1993 | Mizobata et al. | 74/502.5 |
| 5,451,642 A | * | 9/1995 | Abe et al. | 525/179 |
| 5,654,358 A | * | 8/1997 | Kadoi et al. | 524/505 |
| 5,804,268 A | * | 9/1998 | Mukawa | 428/36.4 |

\* cited by examiner

*Primary Examiner*—Sandra M. Nolan
(74) *Attorney, Agent, or Firm*—Schnader Harrison Segal & Lewis LLP

(57) ABSTRACT

Multilayered moldings, which comprise a laminate structure of (A) a layer of a polyphenylene sulfide resin (hereinafter referred to as PPS resin) composition and (B) a layer of a thermoplastic resin except PPS resins and which are characterized in that the PPS resin composition constituting the layer (A) comprises (A1) 100 parts by weight of a PPS resin, (A2) from 1 to 80 parts by weight of a thermoplastic resin having at least one functional group selected from epoxy groups, acid anhydride groups, carboxyl group and its salts, and carboxylate groups, and (A3) from 5 to 80 parts by weight of a thermoplastic resin that is similar in kind to the thermoplastic resin constituting the layer (B), have good hot water resistance, antifreeze resistance, chemical resistance, heat resistance, abrasion resistance, gas permeation resistance and interlayer adhesion.

15 Claims, No Drawings

LAMINATE CONTAINING A LAYER COMPOSED OF POLYPHENYLENE SULFIDE BLENDED WITH OTHER POLYMERS

The present invention relates to multilayered moldings with good hot water resistance, antifreeze resistance, chemical resistance, heat resistance, abrasion resistance, gas permeation resistance and interlayer adhesion.

BACKGROUND ART

Polyphenylene sulfide resins (hereinafter referred to as PPS resins) have good heat resistance, hot water resistance, chemical resistance and flame resistance, while having good electric characteristics, and there is increasing a great demand for the applications of those PPS resins to electric and electronic parts and also to car parts. Recently, Japanese Patent Publication No. 6-98673 has disclosed hollow molding materials comprising PPS resins, referring to the characteristics of the resins.

However, PPS resins require high molding temperatures while solidifying rapidly. Therefore, where those resins are molded, for example, through blow molding or extrusion to give moldings with good outward appearance, the temperature of the molds to be used must be high. For these reasons, the PPS resins are not favorable in view of their moldability and economic aspects.

On the other hand, regarding hollow moldings of thermoplastic resins, such as ducts and fuel lines in car engine rooms, various techniques of producing them have been popularized through blow molding and extrusion of polyamide resins and saturated polyester resins.

However, since single-layered hollow moldings of those conventional thermoplastic resins such as polyamide resins and saturated polyester resins have poor heat resistance, chemical resistance, gas permeation resistance and abrasion resistance, their applications are limited. Therefore, products with much more improved heat resistance, chemical resistance, gas permeation resistance and abrasion resistance are required.

Given this situation, it may be considered to laminate a thermoplastic resin except PPS resins and a PPS resin to obtain laminate moldings having both the characteristics of the former thermoplastic resin characterized by its good mechanical properties, moldability and availability, and the characteristics of the latter PPS resin characterized by its good heat resistance, hot water resistance and chemical resistance. However, even if a PPS resin and a thermoplastic resin except PPS resins are directly laminated together, interlayer peeling is inevitable in the resulting laminates because of the absence of interlayer adhesiveness between the two different resins, and therefore the intended moldings could not be obtained.

On the other hand, a method of interposing an adhesive layer between a PPS resin and a thermoplastic resin except PPS resins to give laminates of the two resins has been proposed. For example, Japanese Patent Application Laid-Open No. 5-193060 discloses a laminate structure comprising a PPS resin layer and a polyolefin resin layer as laminated via an adhesive therebetween.

However, where multilayered structures are produced through co-extrusion according to the method of interposing such an adhesive layer between two different resin layers, an increased number of extruders are needed, resulting in that the working equipment is complicated and requires time-consuming operations. Therefore, the method is problematic in that it is uneconomical and disadvantageous in practical use.

One object of the present invention is to provide multi-layered moldings with well-balanced and good heat resistance, hot water resistance, chemical resistance to, for example, zinc chloride, calcium chloride and amines, gas permeation resistance, abrasion resistance, moldability and interlayer adhesion.

Another object of the invention is to provide PPS resin compositions with good surface smoothness and moldability, which can be formed into multilayered moldings with such good characteristics.

DISCLOSURE OF THE INVENTION

The invention is summarized as follows:

A multilayered molding comprising a laminate structure of (A) a layer of a polyphenylene sulfide resin (hereinafter referred to as PPS resin) composition and (B) a layer of a thermoplastic resin except PPS resins, in which the PPS resin composition constituting the layer (A) comprises (A1) 100 parts by weight of a PPS resin, (A2) from 1 to 80 parts by weight of a thermoplastic resin having at least one functional group selected from epoxy groups, acid anhydride groups, carboxyl group and its salts, and carboxylate groups, and (A3) from 5 to 80 parts by weight of a thermoplastic resin which is similar in kind to the thermoplastic resin constituting the layer (B).

BEST MODES OF CARRYING OUT THE INVENTION

The constituent components and the structure of the multilayered, tubular, thermoplastic resin moldings of the invention are described in detail hereinunder.

The PPS resin (A1) for use in the invention is a polymer comprising a repeating unit of the following structural formula in an amount of preferably 70 mol % or more, more preferably 90 mol % or more.

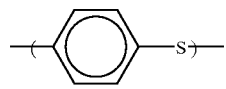

PPS resins usable in the invention include relatively low molecular weight polymers to be produced, for example, by the method described in Japanese Patent Publication No. 45-3368, and substantially linear, relatively high molecular weight polymers to be produced, for example, by the method described in Japanese Patent Publication No. 52-12240; and the former polymers as produced by the method described in Japanese Patent Publication No. 45-3368 could be heated in an oxygen atmosphere or could be heated in the presence of a crosslinking agent such as peroxides to thereby make them have an increased molecular weight, prior to being used in the invention.

PPS resins obtained by any methods can be used in the invention, but preferred are substantially linear, relatively high molecular weight polymers.

PPS resins for use in the invention could be so modified as to comprise any of repeating units of the following structural formulae in an amount of less than 30 mol % of the total repeating units.

Desirably, the PPS resin (A1) to be used in the invention is one as prepared through ordinary polymerization such as that mentioned above followed by deionization to be effected by washing the polymers with an aqueous acid solution or an organic solvent.

The washing of PPS resins with an aqueous acid solution may be effected, for example, as follows:

Acids to be used for the washing are not specifically defined, provided that they do not decompose PPS resins. For example, employable is any of acetic acid, hydrochloric acid, sulfuric acid, phosphoric acid, silicic acid, carbonic acid and propionic acid. Of those, preferred are acetic acid and hydrochloric acid. However, nitric acid and others that decompose and deteriorate PPS resins are unfavorable.

To wash PPS resins with such an aqueous acid solution, for example, the resins are dipped in the solution optionally with stirring or heating them. In one example using acetic acid, a powdery PPS resin is dipped in an aqueous acetic acid solution having a pH of 4, and stirred therein for 30 minutes under heat at 80 to 90° C. to obtain sufficient results. It is desirable that the acid-treated PPS resins are additionally washed several times with cold or warm water to thereby physically remove the remaining acid or salt.

Water to be used for the additional washing is preferably distilled or deionized water, as not interfering with the favorable chemical modifications in the acid-treated PPS resins.

PPS resins for use in the invention may be washed with hot water, for example, in the manner mentioned below.

Hot water to be used for the washing is preferably at 100° C. or higher, more preferably at 120° C. or higher, even more preferably at 150° C. or higher, especially preferably at 170° C. or higher.

It is desirable that the hot water to be used for the treatment is distilled or deionized water, as producing favorable chemical modifications in the treated PPS resins. For the hot water treatment, in general, a predetermined amount of the PPS resin to be treated is put into water in a pressure container and heated therein with stirring. Regarding the ratio of the PPS resin to water, it is desirable that the amount of water is larger than that of the PPS resin. In general, the bath ratio is so determined that the amount of the PPS resin to be treated in one liter of water is not larger than 200 g.

Desirably, the hot water treatment is effected in an inert atmosphere in order to prevent the decomposition of the terminal groups of the PPS resin being treated. After the hot water treatment, it is desirable that the PPS resin is washed several times with warm water to thereby physically remove the remaining components.

PPS resins for use in the invention may be washed with an organic solvent in the manner mentioned below.

The organic solvent to be used for the washing is not specifically defined, provided that it does not decompose PPS resins. For example, employable is any of nitrogen-containing polar solvents such as N-methylpyrrolidone, dimethylformamide, dimethylacetamide, 1,3-dimethylimidazolidinone, hexamethylphosphoramide and piperazinones; sulfoxide-type and sulfone-type solvents such as dimethylsulfoxide, dimethylsulfone and sulfolane; ketone-type solvents such as acetone, methyl ethyl ketone, diethyl ketone and acetophenone; ether-type solvents such as dimethyl ether, dipropyl ether, dioxane and tetrahydrofuran; halogen-containing solvents such as chloroform, methylene chloride, trichloroethylene, dichloroethylene, perchloroethylene, monochloroethane, dichloroethane, tetrachloroethane, perchloroethane and chlorobenzene; alcoholic and phenolic solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Of those organic solvents, especially preferred are N-methylpyrrolidone, acetone, dimethylformamide and chloroform. The organic solvents can be used in a single or mixed solvent system.

To wash PPS resins with such an organic solvent, for example, the resins are dipped in the organic solvent optionally with stirring or heating them. The washing temperature for the treatment is not specifically defined and may be from room temperature to 300° C. or so. The higher the washing temperature is, the higher is the washing efficiency to be attained. In general, however, the washing temperature may be from room temperature to 150° C. or so to produce good results. If desired, PPS resins may be washed with an organic solvent in a pressure container under pressure and at a temperature not lower than the boiling point of the solvent used. Anyhow, the washing time for the treatment is not specifically defined. For example, depending on the washing condition employed, the washing may be effected generally for 5 minutes or longer in a batchwise washing system to obtain good results. If desired, the washing may be effected in a continuous washing system.

It is sufficient to only wash the PPS resins as obtained through polymerization, with such an organic solvent, but in order to further augment the effect of the invention, it is desirable that the washing of those PPS resins is followed by additional washing thereof with cold or warm water. For example, where the PPS resins are washed with a high-boiling-point, water-soluble organic solvent such as N-methylpyrrolidone, it is preferable that they are additionally washed with cold or warm water to thereby remove the remaining organic solvent. The cold or warm water to be used for the additional washing is desirably distilled or deionized water.

The melt viscosity of the PPS resin (A1) for use in the invention is not specifically defined, provided that the resin itself is kneadable with the other components to be mixed therewith, the thermoplastic resin (A2) having at least one functional group selected from epoxy groups, acid anhydride groups, carboxyl group and its salts, and carboxylate groups, and the thermoplastic resin (A3) which is similar in kind to the thermoplastic resin constituting the layer (B) of which the thermoplastic resin is not a PPS resin, and also with an optional component (A4) of an elastomer having none of epoxy groups, acid anhydride groups, carboxyl group and its salts, and carboxylate groups. In general, the melt viscosity of the PPS resin (A1) may be from 100 to 10,000 poises at 320° C. and at a shear rate of 10 sec$^{-1}$.

The thermoplastic resin (A2) for use in the invention, which has at least one functional group selected from epoxy groups, acid anhydride groups, carboxyl group and its salts, and carboxylate groups, includes, for example, olefinic copolymers and fluorine-containing copolymers having any of those functional groups.

As examples of the epoxy-containing olefinic copolymers, mentioned are olefinic copolymers having any of glycidyl residues of, for example, glycidyl esters, glycidyl ethers and glycidylamines in their side chains; and those as prepared by epoxidative oxidation of the double bond(s) of double bond-containing olefinic copolymers. Of those epoxy-containing olefinic copolymers, preferably used in the invention are copolymers comprising α-olefins and glycidyl esters of α,β-unsaturated acids. The α-olefins include, for example, ethylene, propylene and butene-1. The glycidyl esters of α,β-unsaturated acids may be represented by the following general formula, which include, for example, glycidyl acrylate, glycidyl methacrylate and glycidyl ethacrylate. Preferred is glycidyl methacrylate.

wherein R represents a hydrogen atom, or an alkyl group having from 1 to 6 carbon atoms.

The epoxy-containing compound (A2) of that type may be any of random, block and graft copolymers of α-olefins and glycidyl esters of αβ-unsaturated acids such as those mentioned above.

The epoxy content of those copolymers is preferably from 1 to 50% by weight, more preferably from 3 to 40% by weight. If it is smaller than 1% by weight, the intended results could not be obtained. However, if it is larger than 50% by weight, the copolymers will be unfavorably gelled, while melt-mixed with PPS resins, thereby having some negative influences on the extrusion stability, the moldability and the mechanical strength of the resulting PPS resin compositions. The epoxy-containing olefinic copolymer for use in the invention may be optionally copolymerized with any other olefinic comonomers, such as methyl acrylate, ethyl acrylate, acrylonitrile, styrene, vinyl acetate and vinyl ether, within a range not interfering with the effect of the invention.

The thermoplastic resins of the component (A2), which have any of carboxyl group and its salts, carboxylate groups and acid anhydride groups, are preferably olefinic copolymers, including, for example, those as prepared by copolymerizing polyolefinic resins of, for example, polyethylenes, polypropylenes, polystyrenes, ethylene-propylene copolymers, ethylene-butene copolymers, polybutene, ethylene-propylene-diene copolymers, styrene-butadiene copolymers, styrene-butadiene-styrene (SBS) block copolymers, styrene-isoprene-styrene (SIS) copolymers, polybutadienes, butadiene-acrylonitrile copolymers, polyisoprenes, butene-isoprene copolymers and styrene-ethylene-butylene-styrene (SEBS) block copolymers, with comonomers of, for example, maleic anhydride, succinic anhydride, fumaric anhydride, acrylic acid, methacrylic acid, ethylene-(meth)acrylic acid copolymers, and their salts such as Na, Zn, K, Ca and Mg salts, and methyl acrylate, methyl methacrylate, ethyl acrylate, ethyl methacrylate, propyl, acrylate, propyl methacrylate, butyl acrylate and butyl methacrylate. The copolymerization mode for those olefinic copolymers is not specifically defined, and the copolymers may be any of random copolymers, graft copolymers and block copolymers. Two or more of those thermoplastic resins (A2) having at least one functional group selected from epoxy groups, acid anhydride groups, carboxyl group and its salts, and carboxylate groups may be used in combination.

The amount of the thermoplastic resin component (A2) to be in the PPS resin composition of the invention shall be from 1 to 80 parts by weight, preferably from 3 to 50 parts by weight, relative to 100 parts by weight of the PPS resin component (A1) to be therein. If it is smaller than 1 part by weight, the melt viscosity of the PPS composition is too low and the moldability thereof is poor. If, however, it is larger than 80 parts by weight, the resin (A2) will be unfavorably gelled, when melt-mixed with the PPS resin (A1), thereby having some negative influences on the extrusion stability, the moldability, the mechanical strength and the heat resistance of the resin composition.

The thermoplastic resin (A3) to be in the PPS resin composition of the invention is similar in kind to the thermoplastic resin to be used for laminating it along with the PPS resin composition, and includes for example, polyamides, polyesters, polyolefins, polyacetals, ABS and polyphenylene ethers. Of those, preferred are polyamides and polyesters.

As examples of the polyamides, mentioned are polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polydodecanamide (nylon 12), polyundecanamide (nylon 11), polyhexamethylene terephthalamide (nylon 6T), polyxylylene adipamide (nylon XD6), and their mixtures and copolymers.

Of those, preferred are nylon 6, nylon 66, nylon 11, nylon 12 and their copolymers in view of their heat resistance, moldability and economic aspects.

The degree of polymerization of those polyamide resins is not specifically defined, and may be from 1.5 to 7.0, preferably from 2.0 to 6.5, in terms of the relative viscosity thereof as measured in a 1% solution of concentrated sulfuric acid at 25° C., or may be from 1.0 to 7.0, preferably from 1.5 to 5.0, in terms of the relative viscosity thereof as measured in metacresol (having a polymer concentration of 0.5% by weight) at 25° C.

The saturated polyester resins for use in the invention are not also specifically defined, but are preferably aromatic polyesters to be produced from dicarboxylic acids, of which at least 60 mol % is terephthalic acid, and aliphatic diols. The dicarboxylic acids except terephthalic acid include, for example, aliphatic dicarboxylic acids having from 2 to 20 carbon atoms, such as azelaic acid, sebacic acid, adipic acid and dodecane-dicarboxylic acid; aromatic dicarboxylic acids such as isophthalic acid and naphthalene-dicarboxylic acid; and alicyclic dicarboxylic acids such as cyclohexane-dicarboxylic acid. These may be used either singly or as combined. The aliphatic diols include, for example, ethylene glycol, propylene glycol, 1,4-butane-diol, trimethylene glycol, and hexamethylene glycol.

Preferred examples of the saturated polyesters are polyethylene terephthalate, polypropylene terephthalate, polybutylene terephthalate, polyhexamethylene terephthalate, and polycyclohexylene-dimethylene terephthalate. Of those, especially preferred are polybutylene terephthalate, and copolyesters comprising a dicarboxylic acid component that is comprised of terephthalic acid in an amount of 60 mol % or more, preferably 70 mol % or more, and dodecane-dicarboxylic acid and/or isophthalic acid, and a diol component of 1,4-butane-diol, as they have good mechanical strength.

The degree of polymerization of those polybutylene terephthalate (hereinafter referred to as PBT resin) and copolyesters is not specifically defined, but is preferably from 0.5 to 2.5, more preferably from 0.8 to 2.0, in terms of the relative viscosity thereof as measured in a 0.5% orthochlorophenol solution at 25° C. The degree of polymerization of polyethylene terephthalate for use in the invention is not also specifically defined, but is preferably from 0.54 to 1.5, more preferably from 0.6 to 1.2, in terms of its limiting viscosity as measured in a 0.5% orthochlorophenol solution at 25° C.

The amount of the thermoplastic resin (A3) except PPS resins, which is in the PPS resin composition of the invention, may be from 5 to 80 parts by weight, preferably from 15 to 60 parts by weight, relative to 100 parts by weight of the PPS resin (A1) to be in the composition. If it is smaller than 5 parts by weight, the interlayer adhesion of the multilayered moldings to be obtained herein is poor. However, if it is larger than 80 parts by weight, the PPS resin composition could not have good heat resistance and chemical resistance that is intrinsic to PPS resins.

As comprising the PPS resin (A1), the thermoplastic resin (A2) having at least one functional group selected from epoxy groups, acid anhydride groups, carboxyl group and its salts, and carboxylate groups, and the thermoplastic resin (A3) except PPS resins, the PPS resin composition of the invention produces good adhesion to the other layer (B) of a thermoplastic resin except PPS resins. If the PPS resin composition lacks any of those components (A2) and (A3), the multilayered moldings comprising the composition could not have good interlayer adhesion in practical use.

In the PPS resin composition of the invention, the elastomer (A4) having no epoxy groups, acid anhydride groups, carboxyl group and its salts, and carboxylate groups is not an indispensable component, but may be optionally present in an amount not larger than 70 parts by weight relative to 100 parts by weight of the PPS resin (A1) therein. In general, the elastomer (A4) may be added to the composition in an amount of from 10 to 60 parts by weight to improve the moldability of the composition. The moldings of the composition comprising the elastomer (A4) may have better outward appearance.

As the elastomer (A4), usable is any of polyolefinic elastomers, dienic elastomers, silicone rubbers, fluorine rubbers, polyurethane-type thermoplastic elastomers, polyester-type thermoplastic elastomers, and polyamide-type thermoplastic elastomers.

As examples of those elastomers, mentioned are polyolefinic elastomers such as ethylene-propylene copolymers, ethylene-butene copolymers, polybutenes, ethylene-propylene-diene copolymers, and ethylene-vinyl acetate copolymers; dienic elastomers such as styrene-butadiene copolymers, polybutadienes, butadiene-acrylonitrile copolymers, polyisoprenes, and butene-isoprene copolymers, and their hydrogenated derivatives; and acrylic elastomers such as ethylene-methyl acrylate copolymers, ethylene-ethyl acrylate copolymers, ethylene-isopropyl acrylate copolymers, ethylene-methyl methacrylate copolymers, and ethylene-ethyl methacrylate copolymers.

Of those, especially preferred are ethylene-propylene copolymers, ethylene-butene copolymers, and ethylene-propylene-diene copolymers. Those elastomers for the component (A4) may be used either singly or as combined.

It has been found that, where a layer of a PPS composition layer (A)1 comprising from 45 to 100 parts by weight of a PPS resin and from 0 to 55 parts by weight of a thermoplastic resin having at least one functional group selected from the group consisting of (A2)(1) epoxy groups, (A2)2 acid anhydride groups, (A2)3, carboxyl groups and salts, and (A2)4 carboxylate groups is further laminated to be adjacent to the PPS composition layer (A) in the multilayered moldings of the invention, the heat resistance, the chemical resistance and the gas permeation resistance of the moldings are further improved.

Another aspect of the invention is to provide a PPS composition which comprises a PPS resin, a thermoplastic resin except PPS resins, and a functional group-containing compound, and which gives the moldings good surface smoothness.

The PPS composition is characterized in that, when it is put into a melt indexer (315.5° C., residence time of 5 minutes, load of 5 kg, orifice diameter of 0.0825 inches, orifice length of 0.315 inches) to obtain a gut, and when the gut is projected through a projector, the number of projections having a height of not less than 25 $\mu$m as seen in the surface of the gut is not more than 1 (one) per cm of the gut.

We prepared a simple mixture of a PPS resin and a polyamide resin, and a functional group-containing compound, through simple melt-kneading using a single-screw extruder (screw:distributive mixing). After having observed the melt indexer gut of the composition, we found many projections formed on it. Using a transmission electron microscope, we further observed the projections, and found that, in those projections, the thermoplastic resin other than PPS and the functional group-containing compound were gelled through abnormal reaction therebetween and the resulting gel worsened the surface smoothness of the gut.

The resin composition of the invention may be prepared in any ordinary manner with no specific limitation, provided that it gives moldings with good surface smoothness. In one typical example for the preparation, a mixture of the constituent components is fed into any known melt mixer, such as a single-screw or double-screw extruder, a Bambury mixer, a kneader or a mixing roll, and kneaded therein at a temperature falling between 280 and 340° C.

In order to effectively prevent any abnormal reaction between those constituent components and to further improve the surface smoothness of the moldings, for example, the PPS resin (A1) is first melt-kneaded with all or a part of the epoxy-containing compound (A2), and thereafter the resulting melt mixture is further melt-mixed with a thermoplastic resin (A3) which is not a PPS resin, and the remaining part of the functional group-containing compound (A2); or the PPS resin (A1) is melt-kneaded with a part of the functional group-containing compound (A2) to give a first composition, while, on the other hand, the thermoplastic resin (A3) which does not contain PPS resins is melt-mixed with the remaining part of the functional group-containing compound (A2) to give a second composition and thereafter those first and second compositions are melt-kneaded. These methods are extremely effective for the intended purpose.

Another method is also effective for that purpose, in which the PPS resin (A1) is first melt-kneaded with all or some of the functional group-containing compound (A2) and some of the functional group-free elastomer (A4), and the resulting composition is thereafter melt-kneaded with the thermoplastic resin (A3) which contains no PPS resins, or with the resin (A3) and the remaining part of (A2) and (A4).

In such multi-stage kneading, the order of addition of the PPS resin (A1), the functional group-containing compound (A2) and the thermoplastic resin (A3) containing no PPS resin to the mixing device is not specifically limited. In one example of the multi-stage kneading system, the components to be melt-kneaded in the first stage may be fed into the mixing device through the main hopper while the others to be melt-kneaded in the second stage may be fed into the hopper through side feeders. Where a small amount of additives are desired to be incorporated into the composition, they may be added to the pellets of the melt composition that has been prepared by any of the methods mentioned above, and the resulting pellets may be molded into moldings.

In the multilayered moldings of the invention, the layer (B) of a thermoplastic resin except which is not a PPS resin may optionally contain a filler (D), which, however, is not indispensable. The filler (D), if added, shall be not larger than 100 parts by weight relative to 100 parts by weight of the thermoplastic resin, excepting the PPS resins, of the layer (B). In general, the amount of the filler (D) may be from 10 to 90 parts by weight. When containing the filler (D), the strength, the stiffness, the heat resistance and the dimensional stability of the moldings are further improved.

The filler may be any of fibrous fillers, for example, glass fibers, alumina fibers, silicon carbide fibers, ceramic fibers, asbestos fibers, gypsum fibers, metallic fibers and carbon fibers; and non-fibrous fillers, for example, silicates such as wollastonite, zeolite, sericite, kaolin, mica, clay, pyrophyllite, bentonite, asbestos, talc and alumina silicate, metallic compounds such as alumina, silicon oxide, magnesium oxide, zirconium oxide and titanium oxide, carbonates such as calcium carbonate, magnesium carbonate and dolomite, sulfates such as calcium sulfate and barium sulfate, and also glass beads, boron nitride, silicon carbide and silica. These fillers may be hollow ones. Two or more these fillers may be used in combination. If desired, these fillers may be pre-treated with a silane-type or titanium-type coupling agent prior to their use.

The resin composition for the layer (A) that comprises a PPS resin (A1), an epoxy-containing compound (A2), a thermoplastic resin (A3) other than PPS resins, and a functional group-free elastomer (A4), and also the thermoplastic resin, except PPS resins, for the layer (B) to be laminated with the layer (A) may contain, if desired, any ordinary additives such as nucleating agents, mold release agents, antioxidants, heat stabilizers, lubricants, ultraviolet protectors, colorants and flame retardants, and even a small amount of any other polymers, within a range not interfering with the effect of the invention.

The method which comprises adding the fibrous and/or non-fibrous filler (D) to the thermoplastic resin other than PPS resins, for the layer (B) is not specifically defined. For example, the filler is previously mixed with the resin in a suitable mixer, and then fed into an extruder in which the mixture is melt-kneaded and pelletized, and thereafter the resulting pellets are directly fed into a molding machine; or alternatively, the filler is dry-blended with the resin in a mixer and thereafter the resulting dry blend is directly fed into a molding machine. However, those methods are not limitative.

To produce the multilayered moldings of the invention, any ordinary co-extrusion methods are employable. For example, where two-layered tubular moldings are produced, the PPS resin composition for the layer (A) and the thermoplastic resin other than PPS resins, for the layer (B) are separately fed into two and different extruders, the separate extrusion melts from those two extruders are introduced into one die under pressure, while producing two different tubular melt flows, those melt flows are combined in the die in such a manner that the melt flow of the PPS resin composition forms an inner layer while that of the thermoplastic resin other than PPS resins forms an outer layer, and the thus-combined melt flows are co-extruded out of the die to produce a two-layered tubular molding. For this, any known tube-forming methods and blow molding methods is employable. Where three-layered tubular moldings are produced, three extruders are used to form three layers in the same manner as above (in this case, all the three constituent layers may be different from one another); or two extruders maybe used to form three layers also in the same manner as above (in this case, two of the three constituent layers are the same). Where a larger number of plural extruders are used, four or more multi-layered tubular moldings can be obtained.

The methods mentioned hereinabove are only some examples concretely illustrating the invention, by which, therefore, the invention should not be limited.

The layer constitution comprising the layer (A) of a PPS resin composition and the layer (B) of a thermoplastic resin other than PPS resins in the multilayered moldings of the invention may be freely determined, depending on the requirements for the use of the moldings. For example, for two-layered moldings, one of those resins may be either an inner or outer layer. For three-layered moldings, the interlayer may be made of one of those resins. Depending on the number of laminations, two or more, or even four or more multilayered moldings are obtained herein.

In order to attain firm adhesion between the layer of the PPS resin composition and the layer of the thermoplastic resin other than PPS resins, it is desirable that the molding temperatures for those resins are planned to be as near as possible. If the melting temperature of the PPS resin composition is much lower than that of the thermoplastic resin other than PPS resins and if those resins are co-extruded, the surface of the PPS resin composition will solidify too rapidly resulting in that the interlayer adhesion between the two layers of those resins is lowered. Preferably, the molding temperature for the PPS resin composition falls between 290 and 330° C., while that for the thermoplastic resin other than PPS resins is higher than its melting point by 10 to 80° C.; but more preferably, the molding temperature for the PPS resin composition falls between 290 and 310° C., while that for the thermoplastic resin except PPS resins is to be higher than its melting point by 20 to 60° C.

The multilayered moldings of the invention have good hot water resistance, antifreeze resistance, chemical resistance, heat resistance, moldability and interlayer adhesion. These can be produced, for example, in the form of bottles, tanks and ducts through blow molding, and in the form of sheets, tubes, pipes and films through extrusion molding. The multilayered moldings of those forms are favorably used, for example, as water pipes, fuel tubes and fuel fillers in car parts, and even in electric and electronic parts. In addition, the multilayered moldings of the invention are further applicable to the field of chemicals.

DISCLOSURE OF PREFERRED EMBODIMENTS OF THE INVENTION

Now, the invention is described in more detail hereinunder with reference to the following Examples.

The surface appearance, the antifreeze resistance, the gasohol resistance, the low-temperature impact resistance, the gas permeation resistance, the zinc chloride resistance, and the interlayer adhesion of the multilayered moldings produced in the following Examples and Comparative Examples were measured according to the methods mentioned below.

The PPS resin composition and other resin (for example, polyamide resin) were co-extruded according to any of the tube molding methods or the blow molding methods mentioned hereinabove. Briefly, the two were separately melt-kneaded in different extruders, and then fed into a co-extrusion die in which the two melts were laminated into a two-layered laminate, and thereafter extruded out through the die face at the top of the die to give a two-layered tubular structure or a two-layered parison. In the tube molding method, the two-layered tubular structure or parison was cooled and solidified in a sizing device into a two-layered tube of which the outer layer had an outer diameter of 8 mmφ, an inner diameter of 6 mmφ, and the inner layer had an outer diameter of 6 mmφ, and an inner diameter of 4 mmφ. In the blow molding method, air was introduced into the two layered tubular structure or parison in a blowing mold to give a two-dimensional, two-layered pipe having an outer diameter of 40 mmφ, a length of 300 mm and a wall thickness of 3 mm. The thus-obtained two-layered tube and pipe were evaluated according to the following methods.

1. Surface Appearance:

To evaluate their surface appearance, the two-layered tube and pipe were cut, and the smoothness of the inner and outer surfaces of the thus-cut samples was checked. The samples were graded in the rank of A (excellent), B (good) and C (average) in that order.

The surface smoothness of the PPS resin composition was evaluated as follows: The pellets of the composition were put into a melt indexer (Type C-5059D2-1, manufactured by Toyo Seiki Co., having an orifice diameter of 0.0825 inches and an orifice length of 0.315 inches), kept therein at 315.5° C. for 5 minutes, and then extruded out therethrough under a load of 5 kg into a gut. This operation was effected 10 times to obtain 10 guts. These guts were projected, using a projector (Profile Projector, V-12, manufactured by Nikon Co.), and the number of the projections having a height of 25 μm or larger that existed in the surface of each gut was counted. The length of each gut was 5 cm, and all 10 guts, totaling 50 cm, were checked in that manner to count the number of the projections. The data were averaged to obtain the number of the projections per cm of the guts.

2. Antifreeze Resistance:

The two-layered tube and pipe having a length of 30 cm were filled with an aqueous solution of 50% ethylene glycol, sealed, and kept at 130° C. for 1000 hours. Test pieces were cut out of the thus-treated tube and pipe, and the retention of tensile strength and elongation of those test pieces were measured. The samples having the retention of not smaller than 50% were evaluated good (O), while those having a retention of smaller than 50% were evaluated bad (X).

3. Gasohol Resistance:

The 8 mmφ×6 mmφ tube having a length of 30 cm was filled with a mixture of Fuel C (toluene/iso-octane=50/50) with 25 wt. % methanol, and sealed with metal stoppers at its both ends. This tube was kept in an explosion-proof oven at 60° C., whereupon the weight loss in the tube was measured and plotted with the lapse of time. After the plotting of the weight loss gave a straight line, the weight loss per hour (W) was divided by the inner surface area of the tube (S). The gasohol resistance of the tube sample is represented by the following equation.

Gasohol Resistance (g/m² day)=[W (g/hr)]/[S (m²)]×24 (hrs)

4. Low-Temperature Impact Resistance:

The 8 mmφ×6 mmφ tube that had been produced in the tube molding method was cut into samples each having a length of 30 cm. Each sample was put on a flat bed at −30° C., and a ball having a weight of 0.5 kg was dropped down thereon from a height of 30 cm. 10 samples of one and the same tube were tested in that manner. The low-temperature impact resistance of the tube was represented by the ratio of the number of the broken samples to that of the tested samples.

5. Freon Gas Permeation Resistance:

The 8 mmφ×6 mmφ tube that had been produced in the tube molding method was cut into a sample having a length of 30 cm. The sample was filled with Freon R-134a in an amount of 0.6 +/−0.1 g/cm³, and left in an air thermostat at 100° C. for 96 hours, whereupon the weight change in the sample was measured. From the weight change, we obtained the amount of gas permeation (g/m²·72 hrs) into the sample.

6. Frictional Abrasion Resistance (slide load efficiency):

The 6 mmφ×4 mmφ tube that had been produced in the tube molding method was cut into a sample having a length of 1 m. A 3.8 mmφ steel wire was inserted into the sample, which was then filled with a silicone grease. This sample was wound around a radius of 100 mmR for 360 degrees (single winding), a load (W) of 10 kgf was applied to one end of the wire, and the other end of the wire was drawn and pushed at a rate of 3 cm/sec. This drawing and pushing slide of the wire was repeated for a total of 100 times. Then, the tension (F) from the other end of the wire was measured. The slide load efficiency of the sample was obtained according to the following equation.

Slide Load Efficiency(%)=(W/F)×100

7. Zinc Chloride Resistance:

The two-layered tube and pipe having a length of 30 cm were filled with an aqueous solution of 50% zinc chloride, sealed, and kept at a temperature of 80° C. +/−3° C. for 1000 hours, whereupon the presence or absence of cracks formed in the samples was visually observed.

8. Interlayer Adhesion in Tubular Moldings:

The two-layered tube and pipe were cut into strips having a length of 10 cm and a width of 10 mm. The PPS resin composition layer and the polyamide resin layer were peeled a little at the edge of each strip, and each layer was fastened at the fastener of a tensile tester. In that condition, the both layers were peeled at 180 degrees, and the 180-degree peeling strength (kg/10 mm) of each sample was obtained.

9. Notched Impact Strength:

The resin pellets were molded through injection molding at a resin temperature of 320° C. and a mold temperature of 150° C. to prepare samples. The notched Izod impact strength of each sample was measured according to the method of ASTM D256.

REFERENCE EXAMPLE 1

Polymerization of PPS 3.20 kg of sodium sulfide (25 mols, having a crystal water content of 40%), 4 g of sodium hydroxide, 1.36 kg of sodium acetate trihydrate (about 10 mols), and 7.9 kg of N-methyl-2-pyrrolidone (hereinafter referred to as NMP) were put into an autoclave, and gradually heated up to 205° C. with stirring, whereupon about 1.5 liters of an aqueous distillate containing 1.36 kg of water was removed.

To the resulting residue, added were 3.75 kg of 1,4-dichlorobenzene (25.5 mols) and 2 kg of NMP. After having introduced an inert gas such as nitrogen gas thereinto, the autoclave was sealed and heated at 265° C. for 3 hours. The reaction product thus produced was washed 5 times with hot water at 70° C., and then dried under reduced pressure at 80° C. for 24 hours. Thus was obtained about 2 kg of a powdery PPS resin (P-1) having a melt viscosity of about 1500 poises (at 320° C. and a shear rate of 10 sec).

After the same operation was repeated, the products obtained herein were used in the following Examples.

REFERENCE EXAMPLE 2

Washing of PPS Resin with Aqueous Acid Solution

About 2 kg of the PPS resin powder obtained in Reference Example 1 was put into 20 liters of an aqueous solution of acetic acid having a pH of 4 and heated at 90° C., stirred for about 30 minutes, and then filtered. The thus-filtered residue was thereafter washed with deionized water at about 90° C. until the pH of the wash water reached 7. Then, this was dried under reduced pressure at 120° C. for 24 hours to be powdery. Thus was obtained an acid-washed PPS resin (P-2).

REFERENCE EXAMPLE 3

Washing of PPS Resin with Hot Water

About 2 kg of the PPS resin powder obtained in Reference Example 1 and 10 liters of deionized water were put into an autoclave, which was sealed under, normal pressure and heated up to 175° C. and of which the contents were stirred for about 30 minutes at the elevated temperature and thereafter cooled. Then, the contents were taken out and filtered, and the residue was stirred in about 10 liters of deionized water at 70° C. and then filtered. This operation was repeated for a total of 5 times. Next, the final residue was dried at 120° C. for 24 hours under reduced pressure. Thus was obtained a hot water-treated PPS resin (P-3).

REFERENCE EXAMPLE 4

Washing of PPS resin with Organic Solvent

About 2 kg of the PPS resin powder obtained in Reference Example 1 was put into 20 liters of NMP heated at 100° C., then stirred for about 30 minutes and thereafter filtered. Next, the residue was washed with ion-exchanged water at about 90° C. This was dried at 120° C. for 24 hours under reduced pressure to obtain an NMP-treated PPS resin (P-4).

EXAMPLES 1 to 8, and 10

The materials for the first stage, which are shown in Table 1, were dry-blended in the ratio shown in Table 1, then pre-mixed in a tumbler for 2 minutes, melt-kneaded in a single-screw extruder (screw:distributive mixing) at a cylinder temperature of from 300 to 320° C., cut into pellets using a strand cutter, and dried overnight at 120° C. Next, the dry pellets were pre-mixed with the materials for the second stage, which are shown in Table 1, for 2 minutes in a tumbler, then melt-kneaded in a single-screw extruder (screw:distributive mixing) at a cylinder temperature of from 300 to 320° C., cut into pellets using a strand cutter, and dried overnight at 120° C. Those final pellets were used for testing the resin composition for its impact strength and surface smoothness. The test data obtained are shown in Table 1.

COMPARATIVE EXAMPLES 1 to 3

The same amounts of the same materials as those in Examples 1, 2 and 6 were dry-blended all together, then pre-mixed in a tumbler for 2 minutes, melt-kneaded in a single-screw extruder (screw:distributive mixing) at a cylinder temperature of from 300 to 320° C., cut into pellets using a strand cutter, and dried overnight at 120° C. Those pellets were used for testing the resin composition for its impact strength and surface smoothness. The test data obtained are shown in Table 2.

Comparing the data of Comparative Examples 1 to 3 and those of Examples 1, 2 and 6, it is known that the two-stage kneading for the latter produced significant improvements in the surface smoothness and the impact strength of those samples.

COMPARATIVE EXAMPLE 4

The pellets obtained in Comparative Example 1 were again melt-kneaded in a single-screw extruder (screw:distributive mixing) at a cylinder temperature of from 300 to 320° C., cut into pellets using a strand cutter, and dried overnight at 120° C. Those pellets were used for testing the resin composition for its impact strength and surface smoothness. The test data obtained are shown in Table 2.

From the data of Comparative Example 4, it is known that even when the materials that had been mixed all together were melt-kneaded twice, the surface smoothness and the impact strength of the resin composition sample could not be so much improved to the same degree as in Example 1. Those data of Comparative Example 4 and Example 1 indicate the importance of the order of the melt-kneading of the materials.

EXAMPLE 9

The materials for the first stage and those for the second stage of Example 9, which are shown in Table 1, were separately dry-blended in the ratios shown in Table 1, then separately pre-mixed in different tumblers for 2 minutes, separately melt-kneaded in different single-screw extruders (screw:distributive mixing) at a cylinder temperature of from 300 to 320° C., separately cut into pellets using different strand cutters, and separately dried overnight at (120° C. Those two types of pellets were separately pre-dried in different tumblers for 2 minutes, then melt-mixed together in a single-screw extruder (screw:dustributive mixing) at a cylinder temperature of from 300 to 320° C., cut into pellets using a strand cutter, and dried overnight at 80° C. Those final pellets were used for testing the resin composition for its impact strength and surface smoothness. The test data obtained are shown in Table 1.

From the data of Examples 8 and 9, it is known that the three-stage kneading is effective in further improving the impact strength of the resin composition).

EXAMPLE 11

100 parts by weight of the acid-washed PPS resin (P-2) obtained in Reference Example 2, 40 parts by weight of a nylon 6 resin having a relative viscosity of 4.2, and 40 parts by weight of an epoxy-containing olefinic copolymer, ethylene/glycidyl methacrylate (E/GMA, 88/12, wt. %) copolymer were dry-blended in Henschel mixer, fed into a hopper of a 40-mmφ single-screw extruder, and melt-kneaded therein at a cylinder temperature of 300° C. and a screw revolution rate of 80 rpm to prepare resin pellets.

Those resin pellets were dried at 130° C. for 4 hours, fed into a 30-mmφ extruder, melt-kneaded therein at a cylinder temperature of 300° C., and formed into an inner layer in a co-extrusion die, according to an ordinary multi-layered tube molding system. On the other hand, a nylon 6 resin having a relative viscosity of 4.2 was fed into a 40-mmφ extruder, melt-kneaded therein at a cylinder temperature of 280° C., formed into an outer layer in the co-extrusion die. The resulting two-layered tubular structure thus formed in the die through the lamination of those two polymer compositions was shaped into a two-layered tube having an outer diameter of 8 mmφ, an inner diameter of 6 mmφ and a wall thickness of 1 mm in an ordinary manner using a commercially-available tube-molding apparatus. In this tube, the thickness of the outer layer was 0.8 mm and that of the inner layer was 0.2 mm.

The surface appearance, the antifreeze resistance, the zinc chloride resistance and the interlayer adhesion of the thus-obtained, two-layered tube were determined, and the data obtained are shown in Table 3. As is obvious from Table 3, the surface appearance, the antifreeze resistance and the zinc chloride resistance of this tube are all good and well-balanced, and the interlayer adhesion strength thereof is high to be 5.6 kg/10 mm width.

EXAMPLES 12 to 21

Different two-layered tubes were produced herein in the same manner as in Example 11, except that the PPS resin, the polyamide resin, the epoxy-containing olefinic copolymer and the epoxy-free elastomer constituting the PPS resin composition to form the inner layer, and the amounts of those constituent component, and also the polyamide resin to form the outer layer and its amount were varied as in Table 3. The surface appearance, the antifreeze resistance, the zinc chloride resistance and the interlayer adhesion of those tubes were determined. In addition, the tubes of Examples 18 to 21 were additionally tested for their low-temperature impact resistance, freon gas permeation resistance and gasohol resistance. The data obtained are shown in Table 3.

As is obvious from Table 3, it is known that, in those tube samples, the inner layer of the PPS resin composition comprising PPS resin, polyamide resin, ethylene/glycidyl methacrylate copolymer and elastomer was firmly adhered to the outer layer of polyamide resin to produce high interlayer adhesion therebetween, and that the interlayer adhesion in those samples increased with the increase in the amount of the polyamide resin in the PPS resin composition for the inner layer. In addition, it is also known therefrom that the tubular moldings obtained in these Examples are highly functional ones having good and well-balanced surface appearance, antifreeze resistance, zinc chloride resistance, low-temperature impact resistance, freon gas permeation resistance and gasohol resistance. In particular, the tubular moldings of Examples 20 and 21 were found to have much improved gas permeation resistance and gasohol resistance.

COMPARATIVE EXAMPLES 6, 7, 11 and 12

Tubular moldings were produced in the same manner as in Example 11, except that the polyamide resin or the ethylene/glycidyl methacrylate copolymer was not added to the PPS resin composition, and these were evaluated in the same manner as in Example 11. The data obtained are shown in Table 4. As in Table 4, the interlayer adhesion of those comparative tubular moldings was not on the practical level.

COMPARATIVE EXAMPLES 8 and 13

Using the components shown in Table 4, two-layered tubular moldings having the same shape with a wall thickness of 1 mm as in Example 11 were produced. These were evaluated in the same manner as in Example 11. The data obtained are shown in Table 4.

As in Table 4, the increase in the amount of the polyamide resin and that of the ethylene/glycidyl methacrylate copolymer in the PPS resin composition unfavorably worsened the antifreeze resistance and the zinc chloride resistance of the tubular moldings, while the reduction in the amount of the polyamide resin and that of the ethylene/glycidyl methacrylate copolymer in the PPS resin composition could not produce good interlayer adhesion and good low-temperature impact resistance that might be on the practical level.

COMPARATIVE EXAMPLES 9, 10 and 14

Using nylon 6 or nylon 66 resin, which is the same as that used in Examples 11 to 17, single-layered tubular moldings having the same shape with a wall thickness of 1 mm as in Example 11 were produced in a single-layered tube molding method. These were evaluated in the same manner as in Example 11. The data obtained are shown in Table 4.

As is obvious from Table 4, the single-layered tubular moldings all had poor antifreeze resistance, zinc chloride resistance, freon gas permeation resistance and gasohol resistance, and are unfavorable.

EXAMPLES 22 and 23

Two-layered tubes were produced in the same manner as in Example 11, except that the nylon 6 resin constituting the outer layer and the nylon 6 resin in the PPS composition constituting the inner layer were changed to PBT resin. The slide load efficiency and the interlayer adhesion of those tubular moldings were evaluated, and the data obtained are shown in Table 5.

As is obvious from Table 5, the tubular moldings obtained herein had a high slide load efficiency of from 75 to 80% and a high interlayer adhesion strength of from 4.9 to 5.6 kg/10 mm.

COMPARATIVE EXAMPLES 15 and 16

Two-layered tubes were produced in the same manner as in Example 20, except that the PBT resin was not added to the PPS resin composition.

As in Table 5, the slide load efficiency and the interlayer adhesion of these tubes were not on the practical level.

EXAMPLES 24 to 27

A PPS resin, P-2 was blended with a polyamide resin (nylon 6 or nylon 66 resin), an ethylene/glycidyl methacrylate copolymer and an epoxy-free elastomer, as in Table 6, and the resulting resin composition was pelletized in the same manner as in Example 11.

The pellets of the PPS resin composition were dried at 130° C. for 4 hours, fed into a 30-mm$\phi$ extruder, melt-kneaded therein at a cylinder temperature of 295° C., and formed into an inner layer in a co-extrusion die, according to an ordinary blow molding system. On the other hand, a glass fiber-reinforced nylon 6 or nylon 66 resin was fed into a 50-mm$\phi$ extruder, melt-kneaded therein at a cylinder temperature of 280° C., formed into an outer layer in the co-extrusion die. The resulting two-layered parison thus formed in the die through the lamination of those two polymer compositions was shaped into a two-dimensional, two-layered pipe having an outer diameter of 40 mm$\phi$, a length of 300 mm and a wall thickness of 3 mm in an ordinary manner using a commercially-available blow-molding apparatus. In this pipe, the thickness of the outer layer was 2.7 mm and that of the inner layer was 0.3 mm.

As in Table 6, the interlayer adhesion between the two layers in the pipe samples obtained herein was high to be from 2.0 to 4.1 kg/10 mm width. In addition, the inner surface smoothness, the antifreeze resistance and the zinc chloride resistance of the pipes were all excellent.

COMPARATIVE EXAMPLES 17 and 18

Two-layered pipes were produced in the same manner as in Examples 24 to 27, except that the polyamide resin or the ethylene/glycidyl methacrylate copolymer was not added to the PPS resin composition, and these pipes were evaluated in the same manner as in Examples 24 to 27. The data obtained are shown in Table 7, from which it is known that the interlayer adhesion of those pipes is not on the practical level.

COMPARATIVE EXAMPLES 19 and 20

The glass fiber-reinforced nylon 6 or nylon 66 resin, which had been used in Examples 24 to 27, was blow-molded by itself to form single-layered pipes having the same shape with a wall. thickness of 3.0 mm as in Examples 24 to 27.

The thus-obtained, single-layered pipes were evaluated in the same manner as in Examples 24 to 27, and the data obtained are shown in Table 7, from which it is known that the single-layered pipes are not good since the smoothness of their inner surface was poor and since their antifreeze resistance and zinc chloride resistance were poor.

INDUSTRIAL APPLICABILITY

The multilayered moldings of the invention, which comprise a layer of a PPS resin composition and a layer of a thermoplastic resin other than PPS resins, have good interlayer adhesion, though not having any adhesive layer between the adjacent constituent layers. In addition, the multilayered moldings have good surface appearance, heat resistance, antifreeze resistance, low-temperature impact resistance, gas permeation resistance, and chemical resistance to, for example, zinc chloride and calcium chloride, and they can be molded with ease, and are economical. Accordingly, the multilayered moldings of the invention are favorably employed in various devices that are used for many years while being kept in direct contact with water, aqueous solutions or fuel oil in high-temperature conditions, for example, as fuel lines in vehicles, pipes in cooling systems, and heat carrier circulation pipes in snow-thawing systems and heating systems.

What is claimed is:

1. A multilayered molding comprising a peel resistant laminate structure of (A) a layer of a polyphenylene sulfide resin composition and (B) a layer of thermoplastic resin that being a polyamide resin consists of nylon 11 or nylon 12, or a saturated polyester resin, with (A) and (B) directly a to each other, wherein said layer (A) comprises a mixture of (A1) 100 parts by weight of a polyphenylene sulfide resin, (A2) from 1 to 80 parts by weight of a thermoplastic resin having at least one functional group selected from the group consisting of epoxy groups, acid anhydride groups, carboxyl group and its salts, and carboxylate groups, and (A3) from 5 to 80 parts by weight of a thermoplastic resin which is the same thermoplastic resin as the thermoplastic resin constituting the layer (B).

2. The multilayered molding of claim 1, wherein said layer (A) further contains (A4) from 1 to 80 parts by weight of an elastomer having no epoxy groups, acid anhydride groups, carboxyl group or its salts, or carboxylated groups.

3. The multilayered molding of claim 1, wherein said polyphenylene sulfide resin (A1) is a deionized resin.

4. The multilayered molding of claim 1, in which the functional group containing thermoplastic resin (A2) is an epoxy-containing olefinic copolymer.

5. The multilayered molding of claim 4, in which the epoxy-containing olefinic copolymer (A2) is a glycidyl-containing, modified olefinic copolymer (A2) that consists essentially of an α-olefin and a glycidyl ester of an α,β-unsaturated acid.

6. The multilayered molding of claim 1, wherein the amount of said (A2) is from 5 to 50 parts by weight.

7. The multilayered molding of claim 2, wherein the amount of said elastomer (A4) is from 5 to 50 parts by weight.

8. The multilayered molding of claim 1, wherein said layer (B) additionally contains a filler in an amount of 5 to 200 parts by weight of said layer (B).

9. The multilayered molding of claim 1, shaped through extrusion molding or blow molding.

10. The multilayered molding of claim 1, formed as a tubular molding.

11. The multilayered molding of claim 10, formed as a tubular molding for control cable liners.

12. The multilayered molding of claim 10, formed as a tubular molding for fuel transportation tubes.

13. The multilayered molding of claim 10, formed as a tubular molding for pipes in car engine cooling systems.

14. The multilayered molding of claim 10, formed as a tubular molding for heat carrier circulation pipes in snow-thawing systems or heating systems.

15. The multilayered molding of claim 1, further comprising (C) a layer of a thermoplastic resin or a thermoplastic resin composition.

* * * * *

UNITED STATES PATENT AND TRADEMARK OFFICE
CERTIFICATE OF CORRECTION

PATENT NO. : 6,485,806 B1
DATED : November 26, 2002
INVENTOR(S) : Tateyama et al.

It is certified that error appears in the above-identified patent and that said Letters Patent is hereby corrected as shown below:

Column 2,
Line 62, please insert the following formula:

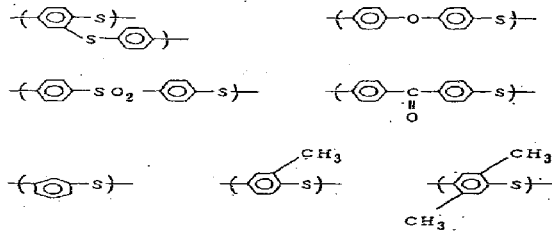

Column 4,
After line 67, please insert the following formula:

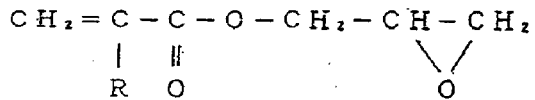

Column 8,
Line 36, please change "resins" to -- resin --.

Column 10,
Line 15, please change "except" to -- other than -- and delete "to be".

Column 12,
Line 40, please change "sec" to -- $sec^{-1}$ --.

UNITED STATES PATENT AND TRADEMARK OFFICE
CERTIFICATE OF CORRECTION

PATENT NO.    : 6,485,806 B1
DATED         : November 26, 2002
INVENTOR(S)   : Tateyama et al.

It is certified that error appears in the above-identified patent and that said Letters Patent is hereby corrected as shown below:

Column 14,
After line 21, please insert the following Table 1 and Table 2:

Table 1

| Components | | 1 | 2 | 3 | 4 | 5 | 6 | 7 | 8 | 9 | 10 |
|---|---|---|---|---|---|---|---|---|---|---|---|
| 1st Stage | (A1) PPS | P-2 100 | P-2 100 | P-2 100 | P-1 100 | P-2 100 | P-2 100 | P-2 100 | P-2 100 | P-2 100 | P-2 100 |
| | (A2) Functional group-having thermoplastic resin | A2-1 10 | A2-1 6 | A2-2 50 | A2-1 6 | A2-1 6 | A2-1 10 | A2-1 6 | A2-1 5 | A2-1 5 | A2-1 5 |
| | (A3) Elastomer with no functional group | A3-1 40 | A3-1 24 | | A3-1 24 | A3-1 24 | A3-1 40 | A3-2 34 | A3-1 15 | A3-1 15 | A3-1 15 |
| 2nd Stage | (A4) Polyamide or saturated polyester | A4-1 50 | A4-1 50 | A4-1 50 | A4-1 50 | A4-3 50 | A4-4 50 | A4-2 50 | A4-1 42 | A4-1 42 | A4-1 42 |
| | (A2) Functional group-having thermoplastic resin | | A2-3 20 | | A2-3 20 | A2-3 20 | | A2-3 10 | A2-3 6 | A2-3 6 | A2-3 6 |
| | (E) Alkoxysilane | | | | | | | | | E-1 0.5 | |
| Notched Izod Impact Strength (J/m) | | 370 | 510 | 100 | 310 | 90 | 420 | 420 | 100 | 350 | 150 |
| Surface Smoothness (number of projections/cm) | | 0.5 | 0.2 | 0.8 | 0.8 | 0.8 | 0.5 | 0.3 | 0.3 | 0.1 or less | 0.3 |
| Number of Times of Kneading | | 2 | 2 | 2 | 2 | 2 | 2 | 2 | 2 | 3 | 2 |

Table 2

| Components | | 1 | 2 | 3 | 4 | 5 |
|---|---|---|---|---|---|---|
| Mixed all together | (A1) PPS | P-2 100 | P-2 100 | P-2 100 | P-2 100 | P-1 100 |
| | (A2) Functional group-having thermoplastic resin | A2-1 10 | A2-1 6 | A2-1 10 | A2-1 6 | |
| | (A3) Elastomer with no functional group | A3-1 40 | A3-1 24 | A3-1 40 | A3-1 40 | A3-1 50 |
| | (A4) Polyamide or saturated polyester | A4-1 50 | A4-1 50 | A4-4 50 | A4-1 50 | A4-1 50 |
| | (A2) Functional group-having thermoplastic resin | | A2-3 20 | | | |
| Notched Izod Impact Strength (J/m) | | 45 | 75 | 320 | 55 | 30 |
| Surface Smoothness (number of projections/cm) | | 10 | 5 | 5 | 5 | (*) |
| Number of Times of Kneading | | 1 | 1 | 1 | 1 | 1 |

For each component, the upper part indicates the compound while the lower part indicates its amount (wt.pts.), (*):  Few projections were found, but the surface of gut was waved.

A2-1: Olefinic copolymer consisting essentially of α-olefin and glycidyl ester of α, β-unsaturated acid, ethylene/glycidyl methacrylate (88/12, wt.%) copolymer.

A2-2: Graft copolymer having a main skeleton of ethylene/glycidyl methacrylate (E/GMA=85/15, wt.%) and grafted with acrylonitrile/styrene (AS, 30/70, wt.%), (E/GMA)/(AS) (70/30, wt.%) copolymer.

A2-3: Maleic acid (0.5 wt.%) -modified ethylene-propylene rubber.

A3-1 Ethylene/butene-1 (82/18, wt.%) copolymer.

A3-2: Ethylene/propylene copolymer.

A4-1: Nylon 11 (BESN O TL, manufactured by Toray Co.).

A4-2: Nylon 12 (AESN OTL, manufactured by Toray Co.).

A4-3: Nylon 6 (CM1046X04, manufactured by Toray Co.).

A4-4: PBT resin (PBT resin 1400S, manufactured by Toray Co.).

E-1: Alkoxysilane compound, β-(3,4-epoxycyclohexyl)ethyltrimethoxysilane.

UNITED STATES PATENT AND TRADEMARK OFFICE
CERTIFICATE OF CORRECTION

PATENT NO.    : 6,485,806 B1
DATED         : November 26, 2002
INVENTOR(S)   : Tateyama et al.

It is certified that error appears in the above-identified patent and that said Letters Patent is hereby corrected as shown below:

Column 15,
After line 23, please insert the following Table 3:

Table 3

| Components (wt.pts.) | | Examples | | | | | | | | | |
|---|---|---|---|---|---|---|---|---|---|---|---|
| | | 11 | 12 | 13 | 14 | 15 | 16 | 17 | 18 | 19 | 20 | 21 |
| Outer Layer | Polyamide Resin | | | | | | | | | | | |
| | Nylon 6 (1) | 100 | 100 | 100 | | | 100 | | | | | |
| | Nylon 66 (2) | | | | 100 | 100 | | 100 | | | | |
| | Nylon 11 (5) | | | | | | | | 100 | | 100 | 100 |
| | Nylon 12 (6) | | | | | | | | | 100 | | |
| Interlayer (1st Inner Layer) | PPS resin | | | | | | | | | | | |
| | P-1 | | | | | | 100 | 100 | | | | |
| | P-2 | 100 | 100 | 100 | | | | | 100 | 100 | 100 | 100 |
| | P-3 | | | | 100 | | | | | | | |
| | P-4 | | | | | 100 | | | | | | |
| | Polyamide Resin | | | | | | | | | | | |
| | Nylon 6 (1) | 40 | 10 | 70 | 35 | 30 | 50 | | | | | |
| | Nylon 66 (2) | | | | | | | 50 | | | | |
| | Nylon 11 (5) | | | | | | | | 50 | | 50 | 50 |
| | Nylon 12 (6) | | | | | | | | | 50 | | |
| | Olefinic Copolymer (3) | 40 | 10 | 20 | 35 | 15 | 50 | 25 | 25 | 25 | 25 | 25 |
| | Elastomer (4) | | 10 | 20 | | 15 | | 25 | 25 | 25 | 25 | 25 |
| Inner Layer (2nd Inner Layer) | PPS resin | | | | | | | | | | | |
| | P-2 | | | | | | | | | | 100 | 100 |
| | Olefinic Copolymer (3) | | | | | | | | | | | 45 |
| Surface Appearance of Tubular Moldings | Outer Surface | A | A | A | A | A | A | A | A | A | A | A |
| | Inner Surface | A | A | A | A | A | A | A | A | A | A | A |
| Antifreeze Resistance (50% LLC) | Retention of Tensile Strength (%) | O | O | O | O | O | O | O | O | O | O | O |
| | Retention of Tensile Elongation (%) | O | O | O | O | O | O | O | O | O | O | O |
| Low-temperature Impact Strength | | - | - | - | - | - | - | - | 0/10 | 1/10 | 5/10 | 0/10 |
| Freon Gas Permeation (g/m²-72 hrs) | | - | - | - | - | - | - | - | 0.3 | 0.6 | <0.1 | <0.1 |
| Gasohol permeation (g/m²-day) | | - | - | - | - | - | - | - | 70 | 70 | 10 | 30 |
| Zinc Chloride Resistance, presence of cracks | | No | No | No | No | No | No | No | No | No | No | No |
| Interlayer Adhesion Strength (kg/10 mm) | | 5.6 | 1.3 | 6.0 | 3 | 2.5 | 4.7 | 4.4 | 6.5 | 4.3 | 6.5 | 6.5 |

(1) Nylon 6, Toray's CM1046X04.
(2) Nylon 66, Toray's CM3006.
(3) Ethylene/glycidyl methacrylate (88/12, wt.%) copolymer.
(4) Ethylene/butene-1, Mitsui Petrochemical's Tafmer A4085.
(5) Nylon 11, Toray's BESN O TL.
(6) Nylon 12, Toray's AESN O TL.

UNITED STATES PATENT AND TRADEMARK OFFICE
CERTIFICATE OF CORRECTION

PATENT NO. : 6,485,806 B1
DATED : November 26, 2002
INVENTOR(S) : Tateyama et al.

It is certified that error appears in the above-identified patent and that said Letters Patent is hereby corrected as shown below:

Column 15 cont'd,
After line 62, please insert the following Table 4:

Table 4

| Components (wt.pts.) | | Comparative Examples | | | | | | | | |
|---|---|---|---|---|---|---|---|---|---|---|
| | | 6 | 7 | 8 | 9 | 10 | 11 | 12 | 13 | 14 |
| Outer Layer | Polyamide Resin | | | | | | | | | |
| | Nylon 6 (1) | 100 | 100 | 100 | 100 | | | | | |
| | Nylon 66 (2) | | | | | 100 | | | | |
| | Nylon 11 (5) | | | | | | 100 | 100 | 100 | 100 |
| Inner Layer | PPS resin | | | | | | | | | |
| | P-2 | 100 | 100 | 100 | | | 100 | 100 | 100 | |
| | Polyamide Resin | | | | | | | | | |
| | Nylon 6 (1) | | 40 | 60 | | | | | | |
| | Nylon 11 (5) | | | | | | | | 50 | 5 |
| | Olefinic Copolymer (3) | 40 | | 40 | | | 25 | | | 3 |
| | Elastomer (4) | | | 40 | | | 25 | | | |
| Surface Appearance of Tubular Moldings | Outer Surface | A | A | A | A | A | A | A | A | A |
| | Inner Surface | A | A | A | A | A | A | A | A | A |
| Anti-freeze Resistance (50% LLC) | Retention of Tensile Strength (%) | O | O | O | X | X | O | O | O | O |
| | Retention of Tensile Elongation (%) | O | O | X | X | X | O | O | O | O |
| Low-temperature Impact Strength | | - | - | - | - | - | 2/10 | 2/10 | 10/10 | 10/10 |
| Freon Gas Permeation (g/m²·72 hrs) | | - | - | - | - | - | 0.1 | 0.1 | <0.1 | >10 |
| Gasohol permeation (g/m²·day) | | - | - | - | - | - | 30 | 30 | 10 | 300 |
| Zinc Chloride Resistance, presence of cracks | | No | No | Yes | Yes | Yes | No | No | No | No |
| Interlayer Adhesion Strength (kg/10 mm) | | 0 | 0.3 | 7.1 | - | - | 0.5 | 0.5 | 0.5 | - |

(1) Nylon 6, Toray's CM1046X04.

(2) Nylon 66, Toray's CM3006.

(3) Ethylene/glycidyl methacrylate (88/12, wt.%) copolymer.

(4) Ethylene/butene-1, Mitsui Petrochemical's Tafmer A4085.

(5) Nylon 11, Toray's BESN O TL.

(6) Nylon 12, Toray's AESN O TL.

UNITED STATES PATENT AND TRADEMARK OFFICE
CERTIFICATE OF CORRECTION

PATENT NO. : 6,485,806 B1
DATED : November 26, 2002
INVENTOR(S) : Tateyama et al.

It is certified that error appears in the above-identified patent and that said Letters Patent is hereby corrected as shown below:

<u>Column 16,</u>
After line 16, please insert the following Table 5:

Table 5

| Components (wt.pts.) | | Examples | | Comparative Examples | |
|---|---|---|---|---|---|
| | | 22 | 23 | 15 | 16 |
| Outer Layer | Saturated Polyester Resin | | | | |
| | PBT Resin (7) | 100 | 100 | 100 | 100 |
| Inner Layer | PPS Resin | | | | |
| | P-2 | 100 | 100 | 100 | |
| | Saturated Polyester Resin | | | | |
| | PBT Resin (7) | 50 | 50 | | |
| | Olefinic Copolymer (3) | 50 | 25 | | |
| | Elastomer (4) | | 25 | 30 | |
| Abrasion Resistance, slide load efficiency (%) | | 80 | 75 | Unmeasurable | 65 |
| Interlayer Adhesion Strength (kg/10 mm) | | 4.9 | 5.6 | 0.5 | - |

(3) Ethylene/glycidyl methacrylate (88/12, wt.%) copolymer.
(4) Ethylene/butene-1 copolymer, Mitsui Petrochemical's Tafmer A4085.
(7) PBT resin, Toray's 1401X04.

After line 45, please insert the following Table 6:

Table 6

| Components (wt.pts.) | | Examples | | | |
|---|---|---|---|---|---|
| | | 24 | 25 | 26 | 27 |
| Outer Layer | Polyamide Resin | | | | |
| | Nylon 6 (1) | 100 | 100 | | |
| | Nylon 66 (2) | | | 100 | 100 |
| | Glass Fiber (5) | 25 | 25 | 43 | 43 |
| Inner Layer | PPS Resin | | | | |
| | P-2 | 100 | 100 | 100 | 100 |
| | Polyamide Resin | | | | |
| | Nylon 6 (1) | 30 | | 40 | |
| | Nylon 66 (2) | | 30 | | 40 |
| | Olefinic Copolymer (3) | 15 | 15 | 20 | 20 |
| | Elastomer (4) | 15 | 15 | 20 | 20 |
| Surface Appearance of Tubular Moldings | Outer Surface | B | B | B | B |
| | Inner Surface | A | A | A | A |
| Antifreeze Resistance (50 % LLC) | Retention of Tensile Strength (%) | O | O | O | O |
| | Retention of Tensile Elongation (%) | O | O | O | O |
| Zinc Chloride Resistance, presence of cracks | | No | No | No | No |
| Interlayer Adhesion Strength (kg/10 mm) | | 4.1 | 2.2 | 2 | 3.8 |

UNITED STATES PATENT AND TRADEMARK OFFICE
CERTIFICATE OF CORRECTION

PATENT NO. : 6,485,806 B1
DATED : November 26, 2002
INVENTOR(S) : Tateyama et al.

It is certified that error appears in the above-identified patent and that said Letters Patent is hereby corrected as shown below:

Column 17,
After line 2, please insert the following Table 7:

Table 7

| Components (wt.pts.) | | Comparative Examples | | | |
|---|---|---|---|---|---|
| | | 17 | 18 | 19 | 20 |
| Outer Layer | Polyamide Resin | | | | |
| | Nylon 6 (1) | 100 | | 100 | |
| | Nylon 66 (2) | | 100 | | 100 |
| | Glass Fiber (5) | 25 | 43 | 25 | 43 |
| Inner Layer | PPS Resin | | | | |
| | P-2 | 100 | 100 | | |
| | Polyamide Resin | | | | |
| | Nylon 6 (1) | | | | |
| | Nylon 66 (2) | | 40 | | |
| | Olefinic Copolymer (3) | 20 | | | |
| | Elastomer (4) | 20 | | | |
| Surface Appearance of Tubular Moldings | Outer Surface | B | B | B | B |
| | Inner Surface | A | A | C | C |
| Antifreeze Resistance (50 % LLC) | Retention of Tensile Strength (%) | O | O | X | X |
| | Retention of Tensile Elongation (%) | O | O | X | X |
| Zinc Chloride Resistance, presence of cracks | | No | No | Yes | Yes |
| Interlayer Adhesion Strength (kg/10 mm) | | O | 0.4 | - | - |

(1) Nylon 6, Toray's CM1046X04.
(2) Nylon 66, Toray's CM3006.
(3) Ethylene/glycidyl methacrylate (88/12, wt.%) copolymer.
(4) Ethylene/butene-1 copolymer, Mitsui Petrochemical's Tafmer A4085.
(5) Glass fibers of 13 μmφ x 3 mmL.

Line 3, please delete "that"
Line 4, please insert -- that -- after "resin";
Line 5, please change "a" (second occurrence) to -- adhered --.

Signed and Sealed this

Twenty-third Day of March, 2004

JON W. DUDAS
*Acting Director of the United States Patent and Trademark Office*